Nov. 18, 1969  A. ASHKIN  3,479,614

TUNABLE SEMICONDUCTOR OPTICAL MASERS

Filed March 23, 1967

INVENTOR
A. ASHKIN
BY
ATTORNEY

United States Patent Office 3,479,614
Patented Nov. 18, 1969

3,479,614
TUNABLE SEMICONDUCTOR OPTICAL MASERS
Arthur Ashkin, Bernardsville, N.J., assignor to Bell Telephone Laboratories, Incorporated, Murray Hill, N.J., a corporation of New York
Continuation-in-part of application Ser. No. 287,957, June 14, 1963. This application Mar. 23, 1967, Ser. No. 625,439
Int. Cl. H01s 3/18
U.S. Cl. 331—94.5          3 Claims

ABSTRACT OF THE DISCLOSURE

A tunable p-n junction type optical maser has two or more current sources connected to one side of the junction. The current density in the junction and hence the frequency of oscillation is varied by varying the amount of current supplied to each connection.

---

CROSS REFERENCES TO RELATED APPLICATIONS

This application is a continuation-in-part of United States patent application Ser. No. 287,957, filed June 14, 1963, of Arthur Ashkin, now United States Patent 3,340,-479, issued Sept. 5, 1967.

BACKGROUND OF THE INVENTION

The invention relates to optical masers utilizing semiconductor devices characterized by having a junction separating regions of different conductivity type.

The invention of the optical maser, or laser, which generates coherent light waves, has greatly expanded the band-width available for communication purposes, for example. In addition, it has made available high intensity coherent light beams which are useful in a wide range of applications. In the present state of the art, the various types of optical masers, such as, for example, gaseous, solid, or semiconductor, produce an output that is, in general, restricted to a single optical frequency or, in some cases, harmonics thereof. Obviously, the limitation to a single output frequency restricts the utility of any particular optical maser device. As has been demonstrated in microwave generation, the property of tunability over a wide range of frequencies greatly enhances the utility of the generator device. In addition, the limitations on output frequency of the various optical maser devices have left gaps in the optical frequency spectrum which have been, up to the present time, left unfilled for want of maser generators at those frequencies. As a consequence, in many applications, it is necessary to design the system to operate with the available frequency rather than operate at what often may be the optimum optical frequency for the particular application.

SUMMARY OF THE INVENTION

The present invention is based upon the phenomenon that a p-n junction device of, for example, gallium-arsenide (GaAs) can be made to produce coherent emission at optical frequencies when biased in the forward direction, provided a certain minimum amount of current passes through the junction. Such devices exhibit fluorescence (incoherent radiation) until this minimum amount of current, known as the threshold current, is reached, at which time the device emits coherent radiation. In addition, the current density through the junction determines the frequency of the coherent radiation.

I have found that these characteristics of p-n junctions may be utilized in a manner to be more fully explained hereinafter, to produce a tunable optical maser, which gives a coherent light output over a wide band of frequencies.

In an illustrative embodiment of the invention, a p-n junction device having a single elongated junction has a plurality of contacts arranged adjacent to each other and contacting the p-layer of the device. Each of the contacts is supplied or is connected to a variable voltage or current source. As discussed heretofore, oscillation and the production of coherent radiation occurs at a particular total current through the junction. In the illustrative embodiment, the current density is varied by varying the current supplied to each of the contacts, thereby varying the frequency of the optical radiation. Such an arrangement is continuously variable over a wide range of frequencies. Where current is supplied to some, but not all of the contacts, some shift in the oscillation threshold may occur due to the losses in those portions of the junction to which current is not applied. In order that the current applied, may be localized to the junction region immediately below the contacts, high resistance regions are created between the contacts, as by notching the layer to which the contacts are connected in the region between the contacts.

DETAILED DESCRIPTION

Figure 1:
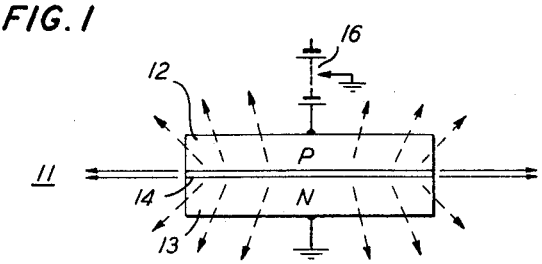
FIG. 1 is a side view of a p-n junction optical maser device.
Figure 2:
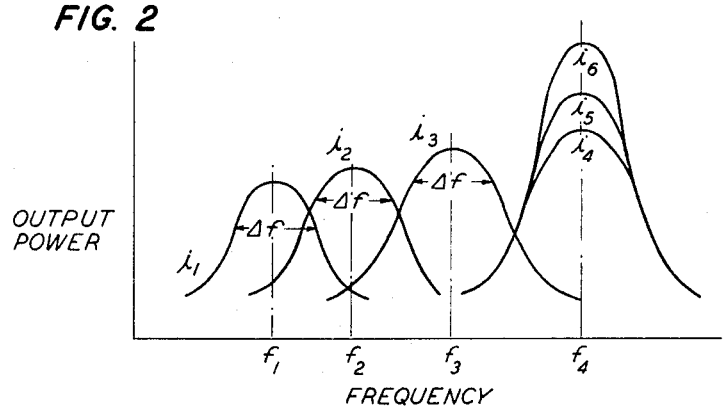
FIG. 2 is a graph of the output frequency and output power of the device of FIG. 1 for different values of energizing current.

Turning now to FIGS. 1 and 2, there is depicted, in FIG 1, a p-n junction device 11 having a p-region 12 and an n-region 13 separated by a junction 14. A source 16 of variable voltage has its positive terminal connected to the p-region 12 while the n-region 13 is connected to ground. As a consequence, the device 11 is in a forward bias condition. The material of device 11 may be any one of a number of suitable semiconductor materials which exhibit maser properties in the optical range. One such material is GaAs, properly doper, and, for illustrative purposes only, the following discussion deals with this material.

In FIG. 2, there is shown a graph which depicts the behavior of the device 11 when subjected to varying currents supplied by source 16. As can be seen in FIG. 2, when a current $i_1$ is passed through the junction 14, the junction fluoresces at a center optical frequency $f_1$. The fluorescent radiation is incoherent, as depicted by the dotted arrows in FIG 1. When the current is changed to $i_2$ the center frequency of the fluorescent radiation shifts to frequency $f_2$, and the power output increases. However, the width of the frequency spectrum $\Delta f$, at the half power (3 db) points, remains substantially the same as for the current $i_1$. When the current is increased to $i_3$, the center frequency shifts to $f_3$ and the power output again increases, while the half power frequency spread remains substantially the same.

The device 11 is, essentially, a resonator whether or not reflecting members are placed at the ends thereof. The impedance discontinuity at the ends is sufficient to cause substantial reflection, and hence it is possible to set up standing waves along the junction length. Inasmuch as there are losses in the resonator, the device 11 will not commence to "mase," i.e., emit coherent radiation, until the gain in the resonator is sufficient to overcome the losses. This condition is reached when the current in the junction is great enough. In FIG. 2, this threshold current is depicted as curve $i_4$, and device 11 produces coherent radiation at a frequency $f_4$, as indicated by the solid arrows in FIG. 1. The frequency $f_4$ is not determined by the total current, however, but the current density in the junction. For the arrangement of FIG. 1, current density varies directly as the total current. However, as will be apparent hereinafter, it is possible to vary current density independently of the total current. Once the device 11 commences to generate coherent radiation, further increase in current and current density do not effect the frequency, as depicted by curves $i_5$ and $i_6$ in FIG. 2, although the output power is increased.

Figure 3:
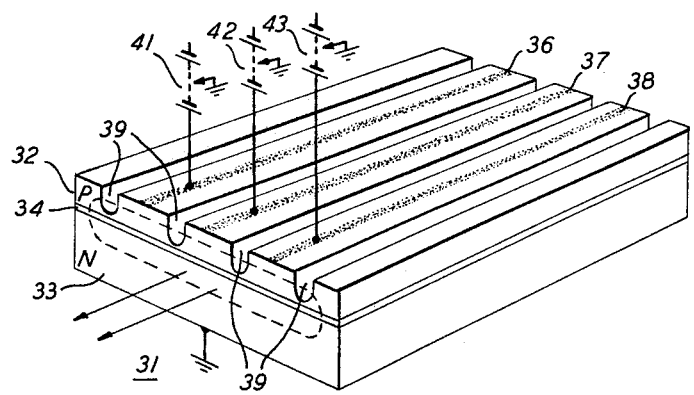
FIG. 3 is a perspective view of an illustrative embodiment of the present invention.

In FIG. 3, there is depicted an illustrative embodiment of the present invention which utilizes a single p-n junction to produce tunable optical maser action over a wide band of frequencies.

The embodiment of FIG. 3 comprises a semiconductor device 31 having a layer 32 of p-type material and a layer 33 of n-type material with a junction 34 between layers 32 and 33. Disposed along the upper surface of layer 32 are a plurality of conductive strips 36, 37, and 38 forming conductive contacts with layer 32. A plurality of longitudinally extending notches 39 extend parallel to the strips 36, 37, and 38 so that each strip has on either side thereof a pair of notches 39. Connected to each of the conductive strips 36, 37, and 38 is a variable voltage source 41, 42, and 43, respectively, connected in the forward bias direction.

In operation, if only source 41 is supplying voltage to the device 31, device 31 commences to "mase" when the threshold current is reached, as explained heretofore, and coherent optical radiation is emitted from the junction 34, as indicated by the solid arrows. Coherent optical radiation may also be achieved at right angles to that shown in FIG. 3 and in the plane of the junction if those end faces of device 31 which parallel notches 39 are made sufficiently reflective. Notches 39 perform the function of confining substantially all of the current to the region immediately below the contact strip 36, inasmuch as the lateral resistance to current flow is greater, because of notches 39, than the resistance from the p-layer 32 to the n-layer 33. The frequency of the radiation is determined by the current density through the junction 34.

When sources 41 and 42 supply the current, so that the sum of the currents equals the threshold current, the junction 34 emits coherent light, by the frequency of the emitted radiation is reduced inasmuch as the current density is reduced by a factor of two from that which existed when only source 41 supplied the current. When sources 41, 42, and 43 supply the current, the current density is reduced by a factor of three, with a consequent reduction in frequency. In like manner, additional sources and conducting strips will produce further changes in frequency. Device 31 preferably forms a resonator oscillating in a singel mode, the limits of which are indicated by the dotted lines in FIG. 3. For proper operation, it is desirable that all of the current or voltage sources feed this mode. As pointed out heretofore, there may occur some shift in the threshold current value due to losses in those portions of the junction to which no current is applied. This does not, however, effect the basic tunability of the device as described.

From the foregoing, it can be seen that the principles of the present invention produce tunable optical maser action. The embodiment shown is by way of illustration, and other arrangements utilizing the invention principles are possible. For example, it is possible to utilize a light attenuating glass that is movable relative to the junction to vary the amount of loss in the resonator system for additional control.

In the embodiment shown, the various voltage sources have been depicted schematically as batteries. It is to be understood that this is a schematic representation only, and that the sources may take any one of a number of forms, depending upon the particular application such as a variable frequency source to give pulse generation or modulated output.

While various embodiments of the principles of the invention have been shown or suggested, other embodiments may readily occur to workers in the art without departing from the spirit and scope of the invention.

What is claimed is:

1. An optical maser comprising a region of p-type conductivity semiconductor material and a region of n-type conductivity semiconductor material forming a single continuous p-n junction with said p-type region, said junction being characterized by having a threshold of oscillation determined by the total current flow across said junction, and means for varying the frequency of oscillation comprising a plurality of variable current sources connected to a first one of said regions at different areas of connection on said first region, said first region having a plurality of slots therein extending parallel to the direction of coherent light emission, there being at least one of said slots between adjacent areas of connection of said sources to said first region, in order to restrict the current flow from each of said sources to the region of the junction beneath the area of connection of each of said sources to said first region.

2. The optical maser recited in claim 1 in which the semiconductor material in the regions of p-type and n-type conductivity is essentially gallium arsenide.

3. The optical maser recited in claim 1 in which each of said areas is defined by a conductive strip forming electrical contact with said first region.

References Cited

UNITED STATES PATENTS

| | | | |
|---|---|---|---|
| 3,239,688 | 3/1966 | Price | 307—312 |
| 3,257,626 | 6/1966 | Marinace | 331—94.5 |
| 3,303,431 | 2/1967 | Fowler | 307—312 |
| 3,340,479 | 9/1967 | Ashkin | 331—94.5 |

JEWELL H. PEDERSEN, Primary Examiner

E. BAUER, Assistant Examiner